Oct. 3, 1950                  E. L. GINZTON                 2,524,050
APPARATUS AND METHOD OF MEASURING A MAGNITUDE
EXCEEDING THE UNAMBIGUOUS MEASURE CAPACITIES
OF TWO MEASURE-REPRESENTING SIGNALS
Filed March 29, 1944                               2 Sheets-Sheet 1
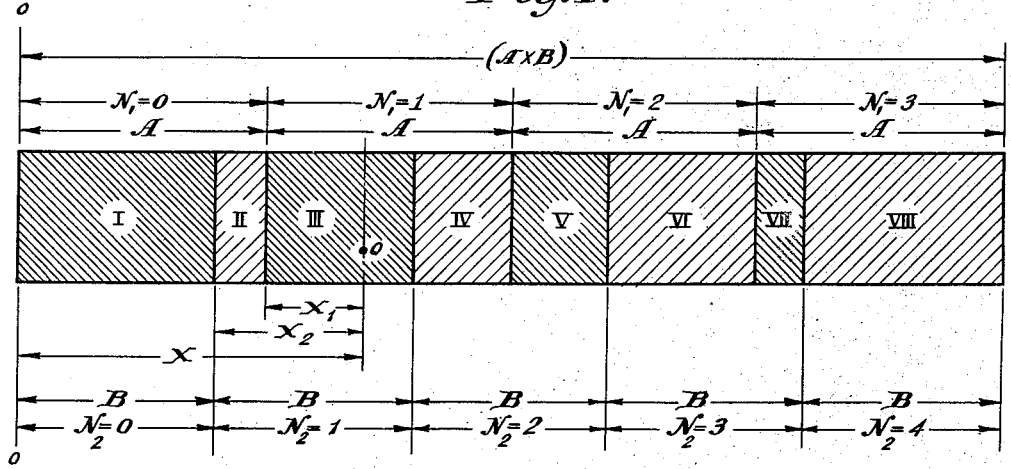
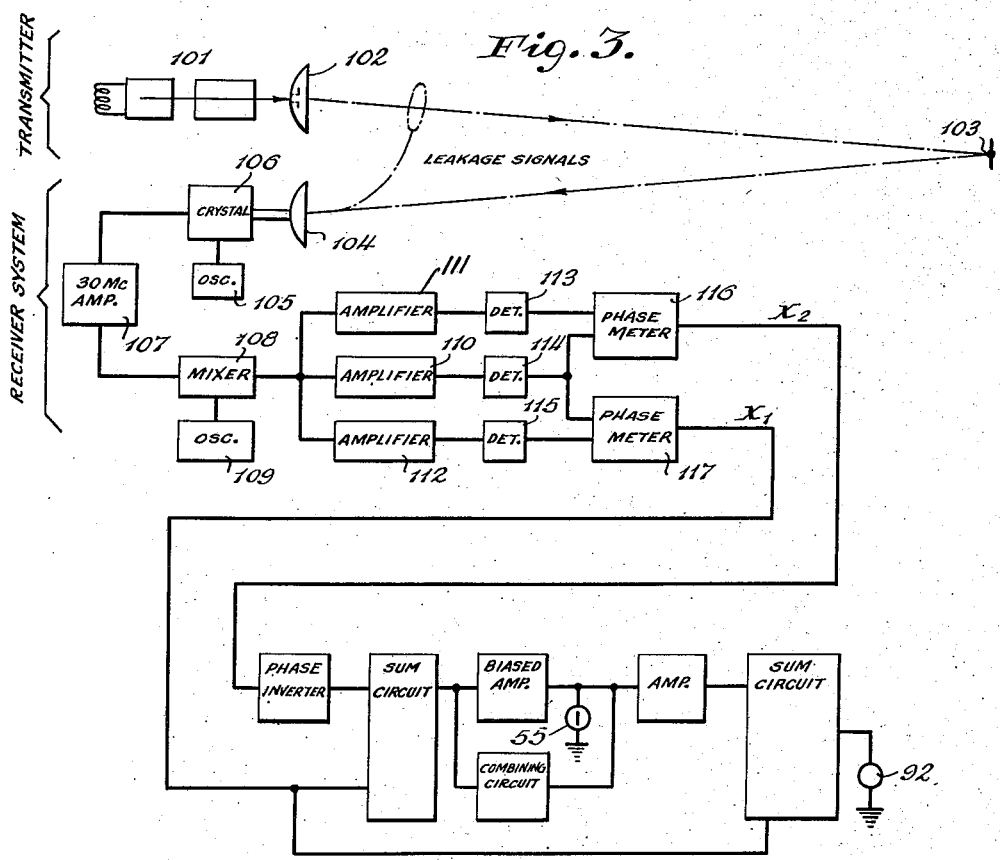
INVENTOR
EDWARD L. GINZTON
BY
ATTORNEY

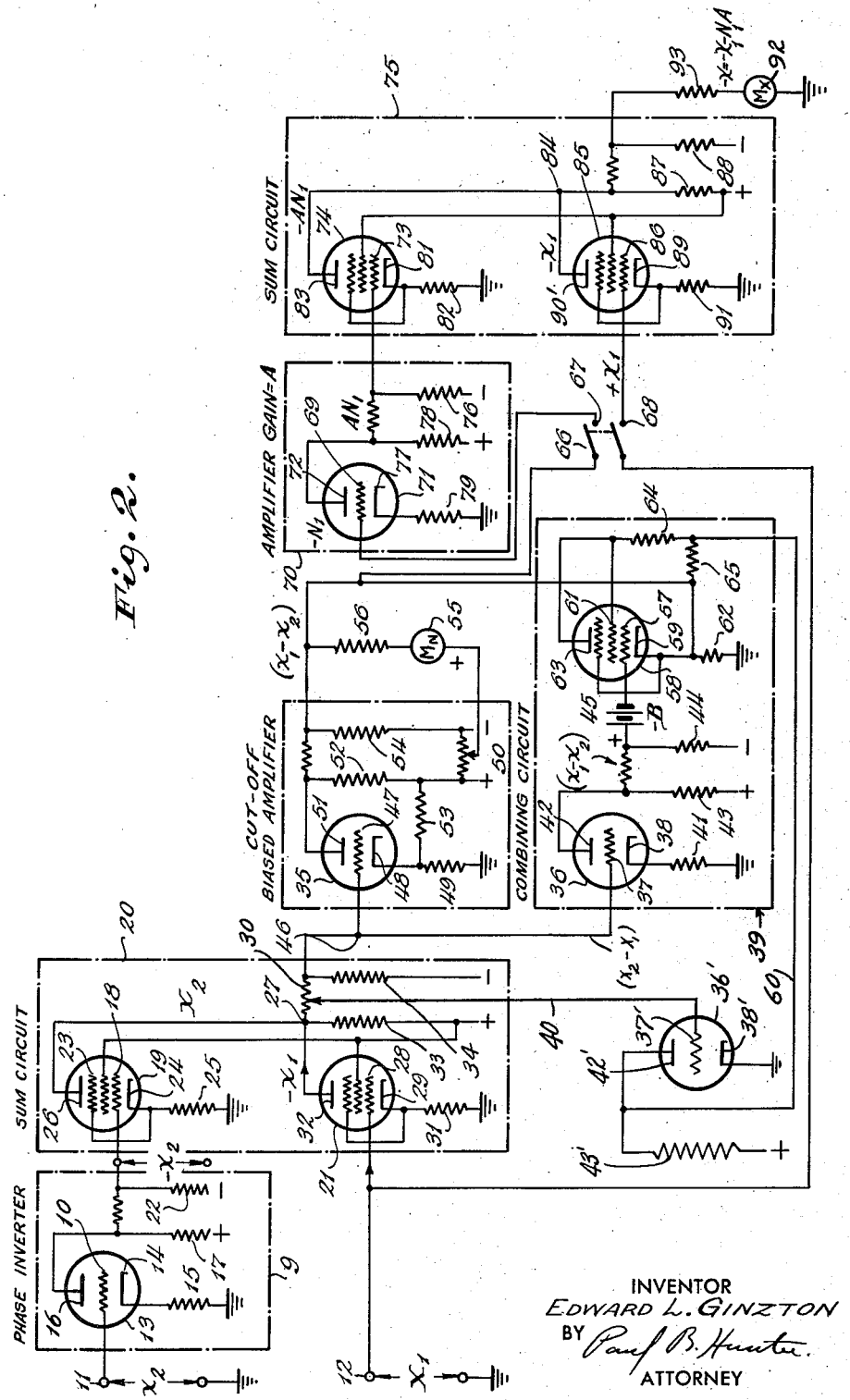

Patented Oct. 3, 1950

2,524,050

UNITED STATES PATENT OFFICE 2,524,050

APPARATUS AND METHOD OF MEASURING A MAGNITUDE EXCEEDING THE UNAMBIGUOUS MEASURE CAPACITIES OF TWO MEASURE-REPRESENTING SIGNALS

Edward L. Ginzton, Garden City, N. Y., assignor to The Sperry Corporation, a corporation of Delaware Application March 29, 1944, Serial No. 528,571

14 Claims. (Cl. 235—61.5)

This application is a continuation-in-part of my copending application U. S. Serial No. 489,209, filed May 31, 1943, for Measuring Device and now abandoned. As embodying my invention, it relates broadly to measuring apparatus and more particularly to what I prefer to call anti-vernier measuring equipment. By the term "anti-vernier" I intend to differentiate between apparatus in which two fine scales are employed to effect a coarse measurement as against apparatus in which two coarse measurements are used to produce a fine measurement as under the Vernier principle of measuring.

It is an object of my invention to provide an anti-vernier method and apparatus for measuring unknown quantities such as range.

Another object of my invention is to provide a method and apparatus for determining or measuring an unknown quantity from two measured unequal quantities measured by two or more indicating devices having unequal maximum capacities.

A further object of my invention is to provide a circuit capable of receiving two voltages which are proportional to two maximum unequal quantities for the purpose of algebraically combining these voltages together with another voltage proportional to a constant and measuring the combined voltage to give an indication of the value of an unknown quantity.

It is also a purpose of my invention to provide a method and apparatus for determining the value of a third unknown in a series of mathematical equations for substitution in one of two such equations solved simultaneously to determine the value of an unknown quantity.

A further purpose of my invention is to provide a method and apparatus for determining an unknown quantity from two or more devices for measuring this unknown quantity.

A still further purpose of my invention is the provision of a method and apparatus for determining the range of a moving object from the readings of two or more registering devices capable of indicating said range in terms proportional to the excess of the measured range over an integral multiple of the unequal maximum-range indication of each device.

A still further object of my invention is to provide an electronic circuit which will automatically determine and indicate an unknown quantity such as range.

Yet another object of my invention is to provide a method and apparatus for extending the measuring range of a plurality of registering devices.

Other objects of my invention will become apparent and those listed more evident as the description proceeds.

In carrying out my invention in a preferred embodiment thereof, I utilize two maximum unequal unambiguous quantities, such as two meter readings of a certain quantiy, to determine an unknown. By a unique method of zoning it is possible for me to combine in at least two equations these maximum unequal unambiguous quantities with the unknown and with a third unknown for simultaneous solution.

Having thus developed mathematical equations which are capable of solution for the unknown, I produce a plurality of voltages proportional to the maximum unequal unambiguous quantities and, through a novel electronic computing circuit, combine them each with the other and with another voltage proportional to a constant to produce a composite voltage which when measured gives the desired determination of the unknown and an indication thereof.

A more comprehensive understanding of my invention will be afforded from the following detailed description when taken together with the accompanying drawings in which:

Fig. 1 is a graphical representation of the variables involved in the mathematical equations upon which the theory of my invention is based;

Fig. 2 is a schematic diagram of a circuit embodying my invention; and

Fig. 3 is a block diagram of a range determining device showing an application of my invention.

Like reference numerals have been used throughout the drawings to designate like parts.

The fundamental principle upon which my invention relies can best be explained through a general mathematical analysis of a physical problem, such as a range determination, it being expressly understood that my invention is not to be limited thereby.

Let it be assumed that the distance to an object occupying a position in space with respect to a fixed reference is to be determined. Let it be assumed further that a system for determining this distance is available, whose maximum range is to be extended. For example, this system may take the form of a continuous wave radar system, where a signal is transmitted to a moving object, reflected therefrom, received at the transmitting station as a reflected signal and compared with the originally transmitted signal for the purpose of determining the distance to the object. Here the meter for measuring this distance will have, by nature of the equipment in question, a maximum indication, which may be taken for purposes of illustration as ten miles. Such equipment has what might be called a repeating characteristic; i. e., for a range exceeding the maximum indication, the indicating pointer may be thought of as making a complete revolution and passing through the zero indication. Thus, if the distance to the object is 98 miles and the meter is graduated in miles, the range indicated will be eight miles, the indicating pointer having theoretically passed through the zero point nine times.

Obviously, unless the range of indication be extended, a correct reading of the distance in excess of ten miles cannot be afforded. In many problems of indication and registry such as the instant case, the solution is not practicably obtained by merely providing a meter of extended registry. Accordingly, I have devised a method for extending the range of indicating devices, which will now be explained in conjunction with the specific problem stated above.

With reference to Fig. 1, let X equal the unknown distance to an object O from the reference OO which is to be determined. Assume two systems are available for measuring this distance whose indicating devices $M_1$ and $M_2$ are capable of registering range in terms which are maximum and unequal.

Assigning general terms to the premises, let:

$X$ = distance to object O;
$X_1$ = reading of meter, $M_1$;
$X_2$ = reading of meter, $M_2$;
$A$ = the maximum range indication of meter, $M_1$;
$B$ = the maximum range indication of meter, $M_2$;
$N_1$ = the number of times, expressed in whole numbers, which the maximum scale reading $A$ of meter $M_1$ is used to register the distance $X$; and
$N_2$ = the number of times, expressed in whole numbers, which the maximum scale reading $B$ of meter $M_2$ is used to register the distance $X$.

Expressing the distance X in terms of the variables for the first system, we have (1) $X_1 = X - N_1 A$ and for the second system (2) $X_2 = X - N_2 B$.

Examination of Equations (1) and (2) reveals the presence of three unknowns, namely, X, $N_1$ and $N_2$, which renders the simultaneous solution of the two equations impossible in the form shown.

An analysis of the physical properties of the problem, however, discloses the existence of a relationship between $N_1$ and $N_2$ which makes possible the solution of the two equations for the unknown X.

Such an analysis defines a series of zones, within the maximum range of the system, designated in Fig. 1 by the Roman numerals I to VIII inclusive, which I prefer to call "even" and "odd" zones, depending upon their numerical characteristics.

It will be noted that zone I, which is odd, is defined by the maximum range B of the system employing the meter $M_2$ and even zone II, by the difference between the two maximum ranges A and B, or (A—B). It follows, therefore, that within the distance described by zone I, the number of times $N_1$ and $N_2$ respectively, which the maximum registry A and B of the meters $M_1$ and $M_2$ are used in indicating the distance are equal each to the other, or $N_1 = N_2$. By similar investigation, it is seen that for distances falling within zone II, $N_2 = N_1 + 1$.

Carrying this procedure through all zones, it will be found that the following generalizations may be made. For the even zones shown in Fig. 1

(3) $N_2 = N_1 + 1$ and for the odd zones shown in Fig. 1

(4) $N_2 = N_1$.

Substituting the value of $N_2$ shown by Equation (4) in Equation (2) and solving Equations (1) and (2) simultaneously, we have for the odd zones:

$$X_2 - X_1 = N_1 A - N_1 B$$

or (5) $$N_1 = \frac{X_2 - X_1}{A - B}$$

For the even zones, the value of $N_2$ shown by Equation (3) is substituted in Equation (2) and Equations (1) and (2) solved for $N_1$ giving $$X_2 - X_1 = B N_1 - B + N_1 A$$

or (6) $$N_1 = \frac{X_2 - X_1 + B}{A - B}$$

Now, if meters $M_1$ and $M_2$ are so chosen that A differs from, and is greater than B by one, the denominators of Equations (5) and (6) are unity and the value of $N_1$ for all odd and all even zones is respectively:

(7) $N_1 = X_2 - X_1$ and (8) $N_1 = X_2 - X_1 + B$ which makes $N_1$ determinable from known quantities.

It now remains to determine, given the readings $X_1$ and $X_2$, in which of the Equations, i. e., (7) or (8), they shall be substituted. Although a rigorous mathematical analysis is not warranted, it may be shown by inspection, assuming the condition that A is greater than B by one [1], that for any set of meter readings, $X_1$ and $X_2$, which when substituted in Equation (7) gives a negative value for $N_1$, the readings refer to an even zone and are properly to be substituted in Equation (8).

With $N_1$ thus determined, it requires but a simple substitution of the known quantities $X_1$, $N_1$ and A in Equation (1) to determine the distance X.

By way of summarizing, an actual range determination made in reverse order may serve to explain further the theory of the above described method. Assume the maximum range A of meter $M_1$ to be five miles and that of meter $M_2$, B, to be four miles, A being greater than B by one. Suppose further that the distance to the object O is seven miles. Then meter $M_1$ will read two miles equivalent to $X_1$ and $M_2$ will read three miles, equivalent to $X_2$. This fact is obvious, since the measured distance of seven miles is two miles in excess of the maximum reading (five) of $M_1$ and three miles in excess of the maximum reading (four) of $M_2$. Substituting the values of $X_1$ or 2, and $X_2$, or 3, in Equation (7)

We have $N_1=3-2=1$, which is positive. Since 1 is positive, we know that the substitution was properly made in Equation (7) and that the object lies in an odd zone. Continuing the solution by substituting the proper values of $X_1$, $X_2$, and $N_1$, equal respectively to 2, 3 and 1, in Equation (1) we have, $X_1=X-N_1A$ or $X=2+(1\times 5)=7$, which satisfies the known distance with which we started, and all other relationships as may be shown graphically by Figure 1, if the proper values of A and B are laid off.

It should here be pointed out that the limit to which the indication of any two measuring systems may be extended by this method is determined by the product of their respective maximum registries. Thus, for the systems employed in the assumed problem above, the maximum range determination would be the product of five and four miles, or twenty miles. Beyond this range, it is easily seen that the readings would become ambiguous. For example, at a distance of twenty-five miles the readings would be identical with those for five miles and the system would provide no means for indicating the actual distance.

Although a range determining system is here used for illustration, it is obvious that the method described is universally applicable to any system of indication. Thus the range meters $M_1$ and $M_2$ might be revolution counters or similar indicating devices whose range of registry it is desired to extend to include the number of revolutions made by a certain device over a period of time which would tax their individual maximum capacities many times over.

Having thus described the theory of my invention, I will now proceed to explain the apparatus with which it is practiced.

In perfecting apparatus for applying my theory of measurement, I have arranged an electronic circuit, illustrated in Fig. 2, which is capable of performing the above-described computations electrically. Here, in the form illustrated, I make provision for the circuit to receive only two voltages respectively proportional to the two available measures of the unknown quantity, it being understood that if the range of the instrument is to be extended in accordance with the statements made above, provision must be made for any number of meters used in determining the unambiguous quantities.

Assuming that only two unambiguous quantities are being used, two voltages $X_2$ and $X_1$ proportional to these quantities, are impressed on circuit input terminals 11 and 12 respectively. The voltage proportional to $X_2$ is taken from the input terminal 11 and delivered to grid 10 of an electronic device 13, which may take the form of a triode, whose cathode 14 is connected to ground through cathode resistor 15. The output of device 13, operating as a phase inverter stage 9, is taken from its anode 16 which receives positive energy through load resistor 17.

This output, which is proportional to $-X_2$, is then delivered to the control grid 18 of electronic device 19, forming one element of a sum circuit 20 including another electronic discharge device 21, illustrated as a pentode. Bias is supplied to the control grid of element 19 from negative source through resistor 22. Suppressor 23 of this element is connected to the cathode 24, which is grounded through cathode resistor 25. The output of element 19, proportional to $\bar{X}_2$, is delivered from plate 26 to connection 27 in the anode circuit of element 21 whose grid 28 receives a voltage proportional to $X_1$, from input terminal 12. Cathode 29 of the latter element is connected to ground through cathode resistor 31 and its output, proportional to $-X_1$, is delivered from anode 32 to the connecting point 27. Positive energy is supplied to anode 32 through plate resistor 33, and negative bias, which controls the gain of element 21, is supplied to the anode circuit through resistor 34.

The output of summation branch 20 is delivered to cut-off biased amplifier 35, phase inverter 36, and switching element 36', and is proportional to the quantity $X_2-X_1$.

Phase inverter 36, which may take the form of a triode, receives the output of sum circuit 20 upon its grid 37. Its cathode 38 is connected directly to ground through the cathode resistor 41 and its anode 42 to positive energy source through the plate resistor 43. Negative bias is supplied to the anode circuit through the bias resistor 44. An energy source, illustrated as battery 45, is connected in this circuit to provide a potential proportional to the constant B appearing in Equation (8) above, which is additive to the output of phase inverter 36, proportional to the quantity $X_1-X_2$.

The output of the first two elements of combining circuit 39, which includes tubes 36 and 58, and connecting battery 45, is proportional to the quantity $X_1-X_2-B$, and is received on grid 57 of element 58. This element, illustrated as a pentode, acts as a positive amplifier, and has its grid 57, anode 63 and cathode 59 connected in the circuit as shown. Cathode resistor 62, bleeder resistor 65, and plate resistor 64, are connected in the various couplings and perform their usual functions. Screen grid 61 receives positive energy from the plate circuit. The output of combining branch 39 is proportional to the quantity $X_1-X_2-B$, and is metered by a meter 55 to give an indication of $N_1$.

Under certain conditions of operations, which will be explained in connection with the operation of the circuit, it is desirable to render the combining circuit 39 inoperative to pass the quantity $X_1-X_2-B$ to the meter 55. To prevent the operation of this branch circuit under these conditions, a switching element 36' is included as an auxiliary part of combining circuit 39. This element, which may take the form of a triode, receives the quantity $X_2-X_1$ from the sum circuit 20 which is taken at point 27 by potentiometer 30 and delivered to its control electrode 37' by means of a conductor 40. The cathode 38' of this element is connected directly to ground, as shown, and its plate electrode 42' receives positive energy through the plate resistor 43'. The plate circuit of element 58 is coupled to the plate circuit of switching element 36' by means of conductor 60.

The voltage proportional to $X_2-X_1$ is also delivered from sum circuit 20, to the grid 47 of element 35, whose cathode 48 is connected to ground through cathode resistor 49. Positive energy is supplied to plate 51 of this element through plate resistor 52, and negative bias through resistor 54. Coupled across element 35, in the anode-cathode lead is a bleeder resistor 53, which supplies bias current to the cathode resistor 49 thereof, causing the element to operate within the linear portion of its characteristic curve. The output of this stage is delivered, as a voltage proportional to the quantity $X_1-X_2$, to meter 55 through dropping resistor 56. The positive terminal of meter 55 is connected to potentiometer 50, as shown.

The remaining portion of the circuit, comprising amplifying stage 70 and summation branch 75, may be selectively placed into or out of the circuit through operation of gang switch 66, depending upon the circuit operation desired.

With gang switch 66 closed to contacts 67 and 68, the output of either biased amplifier 35 or combining circuit 39 is delivered to the control grid 69 of amplifier 71, illustrated as a triode, which has a gain equal to the constant A appearing in Equation (1). In either case the voltage delivered is proportional to the quantity $-N_1$. Plate 72 receives positive energy through the plate resistor 78 and delivers a voltage proportional to quantity $AN_1$ to the control grid 73 of element 74 of sum circuit 75. Bias is supplied to the grid circuit of this element through the resistor 76, and resistor 79 is connected in the ground lead of cathode 77.

Element 74, which may take the form of a pentode, has its cathode 81 connected directly to ground through cathode resistor 82, and its plate 83 connected to deliver the output of this stage to common connecting point 84 in the anode circuit of element 85.

The control grid 86 of this last-named stage, namely 85, receives a voltage proportional to the quantity $X_1$ from the input terminal 12 and delivers the same at a gain of unity to common point 84 in the output circuit of summation branch 75, as $X_1$. Plate 90 receives positive energy through the plate resistor 87 and bias from negative energy source through the biasing resistor 88. From connection 84, the output of circuit 75 is delivered to meter 92, which is grounded as shown, through the dropping resistor 93 and is proportional to the unknown quantity X in the equation $X_1 = X - N_1A$.

Voltage manipulations within the circuit which are indicative of its operation are shown by algebraic expressions in Fig. 2 at the various points where each is effected. From these notations it is apparent that voltages proportional to the quantities $X_2$ and $X_1$ are impressed on the input terminals of the circuit and delivered separately to the various branches thereof for operations equivalent to the solution of the mathematical equations involving the unknowns $N_1$ and X which are to be determined.

A voltage which is proportional to the quantity $X_2$ is delivered to the phase inverter 9 whose gain is equal to unity and delivered to the sum circuit 20 in the form of a voltage proportional to $-X_2$. Similarly the voltage proportional to the quantity $X_1$ is delivered to the sum circuit where the two voltages proportional to $-X_2$ and $X_1$ are combined to form a voltage proportional to the quantity $X_2-X_1$, the tubes of the sum circuit 20 being biased to give each a gain of unity. This last voltage is passed by either the biased amplifier 35 or the phase inverter 36 depending upon the polarity thereof.

If the voltage proportional to the quantity $X_2-X_1$ is negative, such as is the case where meters $M_1$ and $M_2$ are reading measured quantities in even zones, the voltage will not be passed by tube 35, since its cathode 48 is biased positively by bleeder resistor 53 to cut-off, making the tube non-conductive on negative input. If, on the other hand, the voltage is positive, it will pass tube 35, be inverted and measured by meter 55 as a voltage proportional to $X_1-X_2=N$. Further when the voltage proportional to $X_2-X_1$ is negative, tube 36, whose gain is unity, acts as a phase inverter and transmits it to the positive terminal of battery 45 as a voltage proportional to $X_1-X_2$, where it becomes additive to the voltage B of said battery. In both instances it is to be noted that a quantity $-N_1$ is metered.

In order that combining circuit 39 may function properly to pass the quantity $X_2-X_1$ when it is negative, the element 36 thereof must be operated at a point on its characteristic curve such that it will necessarily be affected by positive values of the voltage $X_2-X_1$. Since it is necessary that combining circuit 39 be inoperative and unaffected by values of the voltage $X_2-X_1$ which are positive, an auxiliary switching circuit is a necessary adjunct of this branch of the circuit to render the same inoperative under these conditions. This function is performed by switching element 36'. As previously stated when the quantity $X_2-X_1$ is positive it will pass the tube 35 and be metered at meter 55, and when it is negative it will pass the element 36 and be operated upon in accordance with the functions of combining circuit 39. Further, when the value is negative the switching branch of the circuit, comprising tube 36', is unaffected since a negative voltage is appearing on its control electrode 37' and current is cut off in the tube. This permits element 36 to function in its normal way to pass the negative quantity $X_2-X_1$. When the quantity $X_2-X_1$ is positive, however, under which conditions it is necessary to make combining circuit 39 inoperative, element 36' is rendered conducting due to the positive voltage appearing on its control electrode 37'. Thus a large voltage is made to appear across the plate resistor 43' and the supply voltage on plate 63 of element 58 is reduced to a negligibly low value. This in turn makes the output of combining circuit 39 substantially zero regardless of the value of the voltage appearing on grid 37 of element 36, and in this manner combining circuit 39 is rendered inoperative when the quantity $X_2-X_1$ is positive.

The circuit thus far described is used when the value of $N_1$, only, is to be determined. When operated thusly, it is necessary for the operator to make the proper substitution of the variables $N_1$ and $X_1$ in Equation (1) and solve for the unknown X, or determine its value from a suitable chart based on various substitutions. This mode of operation may have its advantages in some applications.

Where an instantaneous reading of the unknown value is desired, however, the branch of the circuit comprising amplifier 70 and sum circuit 75 is placed in the circuit through the operation of the gang switch 66. With switch 66 closed, the operation for the remaining portion of the circuit comprising the elements 71, 74, and 85 is substantially as follows:

The output of either the cut-off biased amplifier 35 or the combining circuit 39, depending upon which is conducting, is delivered to the control grid 69 of the constant gain amplifier 71 in the form of a voltage proportional to the quantity $-N_1$. Here the voltage is amplified by an amount equal to the constant A appearing in Equation (1) and delivered in the form of voltage proportional to the quantity $AN_1$ from the anode 72 thereof to control grid 73 of element 74 in sum circuit 75.

Within the sum circuit 75 this voltage is combined with a voltage proportional to the quantity $X_1$ which is received through the gang switch 66 and delivered to the control grid of a second element 85.

The combined output of the elements 74 and 85 is then delivered to the meter 92 in the form of a voltage which is proportional to the unknown quantity X equal to the algebraic sum of the voltages proportional to the quantities $X_1$ and $AN_1$ received on the input terminals of sum circuit 75. The scale of the meter 92 may be divided to read directly the unknown quantity in terms of the unit by which it is defined, such as miles, revolutions, etc.

An application of my invention is embodied in the apparatus illustrated in Fig. 3, in which an amplitude modulated transmitter 101 is employed to radiate a transmitted signal from the dipole antenna 102 into free space. This signal comprising a plurality of spaced frequencies, one of which is used as a reference, is directed against the moving object 103, the range of which is to be determined.

The signals which are reflected from object 103 are received by receiving antenna 104 together with leakage signals from transmitter 102. These signals are heterodyned by a local crystal-controlled oscillator 105 (including a crystal 106) and thereafter amplified by amplifier 107. Next they are received by mixer 108 and further heterodyned by oscillator 109. The heterodyned signal, which is due to the reference frequency of the signal transmitted from radiator 102, is then amplified by a selective amplifier 110, and similarly each of the other spaced frequency signals by selective amplifiers 111 and 112.

These frequencies are then demodulated by detectors 113, 114, and 115, the respective outputs of which represent Doppler frequency signals and are delivered to the phase meters 116 and 117. Either phase meter alone could be used to measure a range up to the maximum scale reading of the meter. For extending the range which can be measured thusly, the voltages delivered by both phase-meters are combined. Meters 116 and 117 which may be of a type described in U. S. Patent 2,370,692 issued Mar. 6, 1945 from application. Serial No. 375,373, filed by James E. Shepherd, January 29, 1941, measure the phase differences between the Doppler signals as referred to a selected reference frequency and produce voltages respectively proportional to the quantities $X_2$ and $X_1$ which are in turn delivered to the input terminals of the circuit illustrated in Fig. 2. Under the operation described above, these voltages are here combined and operated upon to deliver to meter 92 a voltage which is proportional to the distance, or range, X. This range may be read directly by meter 92 or calculated from the reading of meter 55 described above.

In illustrating my invention, I have shown basic circuits only, which, of course, are subject to refinements. For example, application requirements might dictate the use of more stable direct current amplifiers than those shown, and if such be the case, they may be connected as described in my copending application Serial No. 479,294, filed jointly by myself and William W. Hansen, March 15, 1943 and now abandoned.

While I have illustrated and described my invention and applications thereof by systems in which electrical voltages are employed, it is to be understood that other forces such as current, hydraulic pressure, etc., could also be used.

These and other modifications of my invention are, of course, possible and may suggest themselves in view of the foregoing disclosure. Accordingly, the invention herein described and illustrated in the accompanying drawings is to be limited only by the appended claims.

What is claimed is:

1. An electronic computer having two pairs of input terminals between the terminals of each of which is applied voltages respectively proportional to different measurements of a quantity, comprising a phase inverter for receiving as its input one of said proportional voltages and producing a proportional inverted voltage, a sum circuit for combining the two voltages, a biased amplifier and a combining circuit for receiving the output of said sum circuit, means for rendering said combining circuit operative depending upon the potential of the output of said sum circuit, and means for measuring the output of said biased amplifier and said combining circuit.

2. Apparatus substantially as claimed in claim 1, having in addition thereto a second biased amplifier with a gain equal to a constant for receiving the outputs of said first biased amplifier and said combining circuit, a second sum circuit for combining the output of said second amplifier with one of said proportional voltages impressed on the input terminals of said circuit, and means for measuring the output of said second sum circuit.

3. Apparatus for determining the magnitude of a quantity beyond the range of either of two measuring devices, two measuring devices having maximum indications differing by unity, said devices being of the repetitive type in which the indication is proportional to the excess of the measured quantity over an integral multiple of the maximum indication of the measuring device, said apparatus comprising in combination with two such measuring devices an electrical computing circuit including means for producing a voltage proportional to the indication of one of said measuring devices, means for producing a voltage proportional to the indication of the other of said measuring devices, means for receiving said proportional voltages and producing a third voltage proportional to the difference between said first two voltages, means for producing a fourth voltage differing by a fixed constant from the difference between said first two voltages, means for selecting one of said third and fourth voltages, means for multiplying said selected voltage by a constant, and means for combining the product of said multiplication with one of said first two voltages to produce a voltage proportional to the quantity to be measured by said apparatus.

4. Apparatus for determining the magnitude of a quantity beyond the range of either of two measuring devices, two measuring devices having maximum indications differing by unity, said devices being of the repetitive type in which the indication is proportional to the excess of the measured quantity over an integral multiple of the maximum indication of the measuring device, said apparatus comprising in combination with said two measuring devices a computer including means for producing input signals proportional to the indications of said respective measuring devices, means for producing therefrom signals representing a computation quantity proportional to the difference between said input signals, means for producing from said input signals a second computation quantity differing by a fixed constant from the difference between said input signals, means for selecting one of said produced signals, means for producing yet a further signal corresponding to a selected computation quantity multiplied by a constant, and means for combining said further signal with one of said input signals to produce an output proportional to the quantity to be measured by said apparatus.

5. Apparatus for receiving first and second distance-representing input voltages and providing an output voltage representing a distance deducible from the difference between said input voltages, comprising means receiving said first and second input voltages for producing a voltage varying as the difference therebetween, first means for receiving said difference voltage and producing a voltage varying in predetermined relation to said difference voltage when said second input voltage exceeds said first input voltage, second means for receiving said difference voltage and producing a voltage varying in predetermined relation to said difference voltage when said first input voltage exceeds said second input voltage, and means responsive to said first and second difference voltage receiving means for indicating a predetermined function of the difference between said first and second input voltages.

6. Apparatus for receiving first and second input voltages and providing an output voltage representing a measure deducible from the difference between said input voltages, comprising means receiving said first and second input voltages for producing a net voltage varying as the difference therebetween, first means coupled thereto for receiving said net voltage and producing a voltage varying substantially in proportion to the difference between said input voltages when said second input voltage exceeds said first input voltage, second net voltage receiving means also coupled thereto and arranged to produce a voltage varying substantially in proportion to the sum of said second input voltage and a constant voltage less said first input voltage when the first input voltage exceeds the second input voltage, and means coupled to said first and second net voltage receiving means and arranged to respond to that one of said first and second net voltage receiving means made responsive according to the polarity of the difference between the input voltages.

7. Apparatus for receiving first and second input voltages and providing an output voltage representing a measure deducible from the difference between said input voltages, comprising means receiving said first and second input voltages for producing a net voltage varying as the difference therebetween, first means for receiving said net voltage and producing a voltage varying in predetermined relation to said net voltage when said net voltage is of a first polarity, second means for receiving said net voltage and producing a voltage varying in predetermined relation to said net voltage when said net voltage is of the opposite polarity, and means coupled to said first and second receiving and producing means and equally responsive thereto for indicating an output voltage function bearing a predetermined relation to said first and second input voltages.

8. Apparatus for receiving first and second distance-representing input voltages and providing an output voltage unambiguously representing a distance which may exceed the distances represented by said first and second input voltages, comprising means receiving said first and second input voltages for producing a net voltage corresponding to the difference therebetween, the polarity of said net voltage indicating which of said input voltages exceeds the other, first means for receiving said net voltage and producing a voltage substantially proportional to said net voltage when said net voltage is of one polarity, second means for receiving said net voltage and producing a voltage substantially proportional to the sum of a constant voltage and said net voltage when said net voltage is of the opposite polarity, and means coupled to both said first and second receiving and producing means and equally responsive thereto for providing an output indication varying according to the voltage supplied thereto.

9. Apparatus as defined in claim 8 wherein said last-named means comprises an amplifier characterized by a predetermined integral amplification factor for producing an output voltage corresponding to an amplified version of the output of one of said first and second receiving and producing means, and means for adding to said output voltage component a further voltage component equal to a selected one of said input signals, whereby the resultant voltage represents said overall distance.

10. Apparatus for receiving first and second distance-representing input voltages and providing an output voltage representing a distance deducible from the difference between said input voltages, comprising means for receiving a first input voltage varying as the marginal distance $X_1$ where $N_1A+X_1$ represents a distance in units, A being the number of said units corresponding to the maximum value of said first input voltage, means for receiving a second input voltage varying as the margin $X_2$ where $N_2B+X_2$ represents the same distance expressed in said units, B being a smaller number of units than A and corresponding to the maximum value of said second input voltage, and the difference between A and B being one of said units, means for producing a voltage varying as the difference between said first and second voltages, means for amplifying said produced voltage by an amplification factor equal to A, and means for augmenting the amplified voltage by a voltage varying according to said first input voltage.

11. In a method of producing a measure of a magnitude X exceeding the unambiguous measure capacities of two measure-representing signals, where the first signal represents the excess $X_1$ of said magnitude X over an integral multiple $N_1A$ of the first measure capacity A and the second signal represents the excess $X_2$ of said magnitude X over an integral multiple $N_2B$ of the second measure capacity B, the process of producing a representation of the integral factor corresponding with one of said capacities comprising the steps of subjecting said first and second signals to a difference-taking circuit to produce a third signal which, when of a predetermined polarity, represents the required integral factor, and producing a fourth signal when said third signal is of the opposite polarity by addition of a constant signal component to said third signal, said fourth signal representing the required integral factor when said third signal is of the polarity opposite said predetermined polarity.

12. In the method of producing a measure of a magnitude which exceeds the unambiguous measure capacities of two measure-representing signals, those steps which comprise measuring the magnitude with a first capacity and supplying a signal proportional to the numerator of the fractional portion of such measurement, measuring the magnitude with a second capacity differing from the first capacity and supplying a signal proportional to the numerator of the fractional portion of such measurement, and obtaining from said signals a signal proportional to the difference therebetween, said last mentioned signal being proportional to the whole number portion of one of said measures.

13. In the method of producing a measure of a magnitude which exceeds the unambiguous measure capacities of two measure-representing signals, those steps which comprise measuring the magnitude with a first capacity and supplying a signal proportional to the numerator of the fractional portion of such measurement, measuring the magnitude with a second capacity differing from the first capacity by unity and supplying a signal proportional to the numerator of the fractional portion of such measurement, and obtaining from said signals a signal proportional to the difference therebetween, said last mentioned signal being proportional to the whole number portion of one of said measures.

14. In the method of producing a measure of a magnitude which exceeds the unambiguous measure capacities of two measure-representing signals, those steps which comprise measuring the magnitude with a first capacity and supplying a signal proportional to the numerator of the fractional portion of such measurement, measuring the magnitude with a second capacity differing from the first capacity by unity and supplying a signal proportional to the numerator of the fractional portion of such measurement, subjecting said signals to a difference-taking circuit to produce a third signal, said third signal being proportional to the whole number portion of one of said measures when of one sign, and producing, when said third signal is of the opposite sign, a fourth signal by adding a constant signal to said third signal.

EDWARD L. GINZTON.

REFERENCES CITED

The following references are of record in the file of this patent:

UNITED STATES PATENTS

| Number | Name | Date |
|---|---|---|
| 1,799,134 | Hardy | Mar. 31, 1931 |
| 2,134,716 | Gunn | July 8, 1941 |
| 2,248,215 | Budenbom | July 8, 1941 |